INVENTOR.
Harris P. Kamide

Nov. 30, 1965 H. P. KAMIDE 3,221,144
ELECTRIC HEATING SYSTEMS
Filed Aug. 29, 1963 3 Sheets-Sheet 2

TEMPERATURE OF MEDIUM

INVENTOR.
Harris P. Kamide
BY
Brangley, Baird, Clayton,
Miller & Vogel,
Attys.

Nov. 30, 1965    H. P. KAMIDE    3,221,144
ELECTRIC HEATING SYSTEMS
Filed Aug. 29, 1963    3 Sheets-Sheet 3

FIG. 5

INVENTOR.
Harris P. Kamide
BY Prangley, Baird, Clayton, Miller & Vogel,
Attys.

United States Patent Office 3,221,144
Patented Nov. 30, 1965

3,221,144
ELECTRIC HEATING SYSTEMS
Harris P. Kamide, Franklin Park, Ill., assignor to General Electric Company, a corporation of New York
Filed Aug. 29, 1963, Ser. No. 305,460
12 Claims. (Cl. 219—489)

The present invention relates to electric heating systems, and more particularly to such systems incorporating hotplates and adapted for use in cooking appliances.

It is a general object of the invention to provide an electric heating system that is essentially adapted for carrying out cooking operations and that includes a heating unit and an improved switching arrangement and electronic control arrangement for selectively governing the electric power that is supplied to the heating unit and consequently the heat that is developed thereby.

Another object of the invention is to provide an electric heating system of the type noted, wherein the high power requirements of the heating unit are supplied by the switching arrangement mentioned and the low power requirements of the heating unit are supplied by the electronic control arrangement mentioned.

Another object of the invention is to provide an electric heating system of the character described, wherein the switching arrangement essentially comprises a switching mechanism having a normal position directly completing heating connections to the heating unit independently of the electronic control arrangement and an operative position completing heating connections to the heating unit via the electronic control arrangement.

Another object of the invention is to provide an electric heating system of the character described, wherein a first control circuit is provided and operatively connected to the switching arrangement and jointly governed by a first controller for setting different desired operating temperatures of the object or medium heated by the heating unit and a second controller for setting in accordance with the heat capacity of the object or medium heated by the heating unit.

In connection with the foregoing object, it is another object of the invention to provide a control circuit of the type set forth for governing the operation of the switching arrangement, whereby substantially full power is applied to the heating unit until just shortly before the temperature thereof reaches the desired operating temperature set by the first controller, the time at which the switching arrangement is actuated being jointly governed by the desired operating temperature set by the first controller and the heat capacity of the object or medium to be heated as determined by the second controller.

Another object of the invention is to provide an electric heating system of the type set forth, wherein the switching arrangement is actuated from its normal position (applying substantially full power to the heating unit) to its operative position (connecting the electronic control arrangement in circuit with the heating unit) in response to the desired operating temperature set and selected by the first controller and the temperature of the medium being heated as determined by a temperature sensing unit in contact therewith.

Another object of the invention is to provide an electric heating system of the type set forth, wherein the switching arrangement is actuated from its normal position (applying substantially full power to the heating unit) to its operative position (connecting the electronic control arrangement in circuit with the heating unit) in response to the desired operating temperature set and selected by a a first manual controller and the heat capacity of the medium to be heated as selected by a second manual controller.

A further object of the invention is to provide an electric heating system of the character described, wherein the electronic control arrangement essentially comprises a solid state controlled rectifier and a control circuit therefor.

A still further object of the invention is to provide an electric heating system of the character described, wherein the switching arrangement essentially comprises a thermostatically operated switch having first and second control heaters therefor, the first control heater being operated to produce heat in accordance with the desired operating temperature of the heating unit as set by a first controller and the second control heater being operated to produce heat in accordance with the heat capacity of the medium to be heated by the heating unit.

Further features of the invention pertain to the particular arrangement of the elements of the electric heating system and of the associated control circuit networks therefor, whereby the above-outlined and additional operating features thereof are attained.

The invention, both as to its organization and method of operation, together with further objects and advantages thereof, will best be understood by reference to the following specification, taken in connection with the accompanying drawings, in which:

Figure 1:
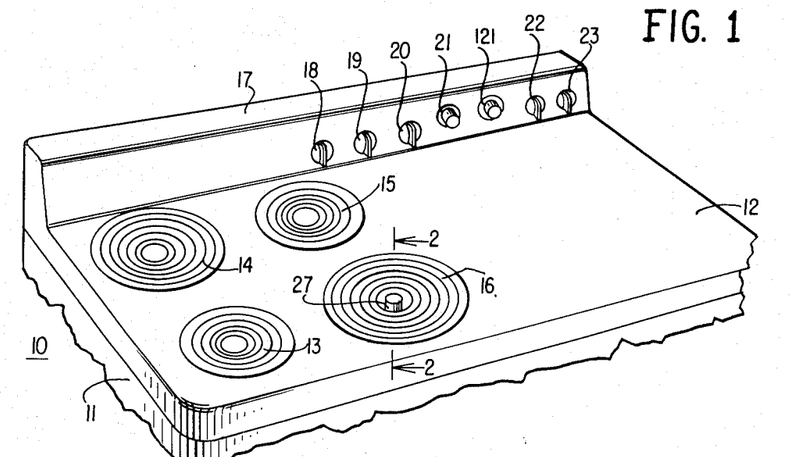
FIGURE 1 is a fragmentary front perspective view of the upper portion of an electric range incorporating therein an electric heating system embodying the present invention.

Referring now to FIG. 1 of the drawings, there is illustrated an electric range 10 incorporating an electric heating system embodying the features of the present invention and comprising an upstanding body 11 provided with a substantially horizontally disposed cooking top 12 supporting a plurality of surface heating units or hotplates 13, 14, 15 and 16 arranged in spaced-apart relationship in a substantially rectangular pattern on the left side thereof; the body 11 houses an oven, not shown, in the righthand portion thereof, and a storage compartment, not shown, in the lefthand portion thereof, the oven and the compartment being respctively provided with front doors, not shown. The cooking top 12 carries an upstanding backsplash 17 adjacent to the rear thereof, that in turn carries a plurality of surface heating unit selector switches 18, 19 and 20, a temperature selective control switch 21, a heat load selective control switch 121, an oven selector switch 22 and an oven regulator or thermostat switch 23, the switches 18–23, inclusive, and 121 being arranged in a row on the righthand side of the backsplash 17. The selector switches 18, 19 and 20, respectively, correspond to the surface heating units 13, 14 and 15, are of conventional construction and are respectively included in the electric heating circuits thereof; while the control switch 21 corresponds to the surface heating unit 16 of special construction and is included in the electric heating circuit thereof; and the control switch 121 in a modification of the electric range 10 cooperates with the control switch 21 and also is utilized in the control of the surface heating unit 16 and is included in the electric heating circuit thereof. Each of the heating unit selector switches 18, 19 and 20 and the oven selector switch 22 as well as the thermostat switch 23 are of convention construction and arrangement.

The cooking top 12 has a plurality of openings therein that respectively receive the electric heating units 13, 14, 15 and 16; and each of the electric heating units 13, 14 and 15 may be fundamentally of the construction disclosed in U.S. Patent No. 2,565,443, granted on August 21, 1951 to Oliver G. Vogel and Francis E. Kirk; while the surface heating unit 16 is of the special construction disclosed in U.S. Patent No. 2,822,455 granted on February 4, 1958 to Robert J. Molyneaux and Kenneth H. Walkoe. More specifically, the surface heating unit 16 is further illustrated in FIG. 2 of the drawings and comprises a spider 24 carrying a heating element L including respectively inner and outer sections $L_a$ and $L_b$, only a portion of the inner section $L_a$ being illustrated. The heating element L is generally in the form of a helical coil or spiral, the turns of which are arranged in radially spaced-apart relation; and preferably the heating element L is of the metal sheathed-helical resistance conductor type disclosed in U.S. Patent No. 1,367,341, granted on February 1, 1921 to Charles C. Abbott. The spider 24 comprises a substantially centrally disposed upstanding ring 26, the coils of the heating element L being selectively staked to the arms of the spider 24 in the general manner disclosed in the Vogel and Kirk patent mentioned. The top surface of the coils of the heating element L are flattened to define a substantially horizontal plane adapted to engage and to support the bottom wall of a cooking vessel, or the like, not shown.

Figure 2:
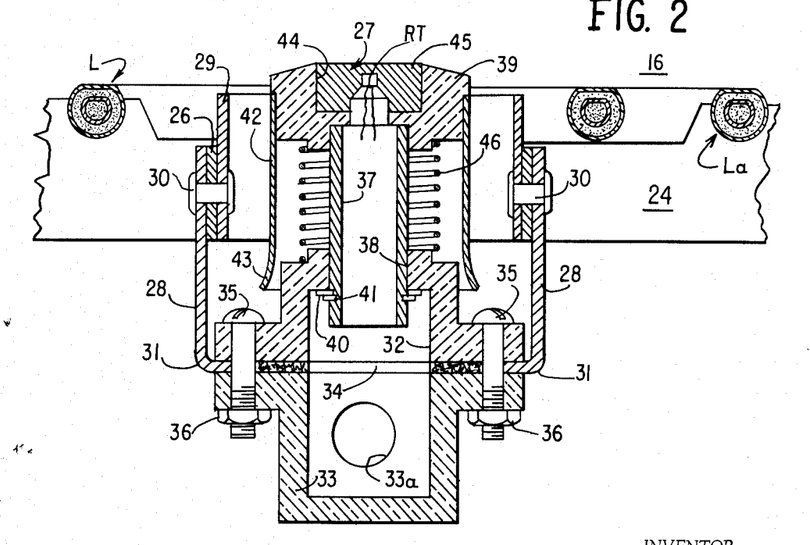
FIG. 2 is an enlarged sectional view of one of the electric heating units or hotplates incorporated in the electric range, taken in the direction of the arrows along the line 2—2 of FIG. 1, and illustrating the construction of the temperature sensing unit incorporated therein and forming a part of the electronic control circuit.

The hotplate 16 carries a temperature sensing unit 27 within the central ring 26 that is adapted to engage the bottom wall of the cooking vessel, or the like, supported upon the heating element L; and more particularly, a pair of opposed dependent arms 28 is arranged exteriorly of the central ring 26, and an upstanding tubular heat shield 29 is arranged interiorly of the central ring 26, the arms 28 and the heat shield 29 being retained in place by a pair of rivets 30. The arms 28 terminate in inwardly directed flanges 31 disposed below the central ring 26 and carry upper and lower cup-shaped housings 32 and 33 formed of lava or the like of good electrical and heat insulating character. The upper housing 32 is arranged in inverted position and constitutes a supporting base, the housings 32 and 33 being retained in place upon the flanges 31, with an asbestos ring 34 clamped therebetween, by removable screws 35 provided with cooperating nuts 36. An upstanding tubular member 37 is slidably mounted in a cooperating opening 38 provided in the top of the housing 32, the upper end of the tubular member 37 carrying an insulating ring 39 formed of lava, or the like, and arranged within the heat shield 29 in spaced relationship with respect thereto. The tubular member 37 is retained in place by an arrangement including a surrounding washer 40 and a cooperating lock ring 41 carried on the lower end thereof cooperating with the undersurface of the top of the housing 32 adjacent the opening 38 therein. The ring 39, in turn, carries a dependent tubular heat shield 42 of general skirt-like structure that is spaced inwardly with respect to the cooperating heat shield 29, the extreme lower end of the heat shield 42 being outwardly flared, as indicated at 43, so that it covers the top of the housing 32. A center cavity 44 is formed in the top of the ring 39 and carries a sensing button 45 formed of aluminum, or the like.

In the arrangement, the heat shields 29 and 42, as well as the tubular member 37, are preferably formed of stainless steel or other bright and reflective material; while the sensing button 45 is formed of aluminum, or the like, as previously noted, so that it constitutes a good heat conductor capable of following closely the temperature of the bottom wall of the cooking vessel, or the like, supported by the heating element L. The tubular member 37, the ring 39, the heat shield 42 and the sensing button 45 are movable as a unit with respect to the housing 32, by virtue of the arrangement of a coil spring 46 surrounding the tubular member 37 and disposed between the top of the housing 32 and the bottom of the ring 39. More particularly, the coil spring 46 normally biases the parts 37, 39, 42 and 45 upwardly with respect to the housing 32; whereby the top surface of the sensing button 45 is normally disposed slightly above the substantially horizontal plane of the flattened top surface of the heating element L. However, when a cooking vessel, or the like, is placed upon the heating element L, the bottom wall thereof engages the top surface of the sensing button 45 moving the elements 37, 39, 42 and 45 downwardly with respect to the housing 32 against the bias of the coil spring 46; whereby the top surface of the sensing button 45 is urged into good thermal contact with the bottom wall of the supported cooking vessel by the coil spring 46.

A temperature sensing resistor RT is arranged in a cooperating centrally disposed cavity formed in the lower surface of the sensing button 45. The temperature sensing resistor RT is, of course, movable with the sensing button 45 and is arranged in good heat exchange relation therewith, for a purpose more fully explained hereinafter, the temperature sensing resistor RT being included in an external electric circuit, described more fully hereinafter, the connecting wire elements extending through the tubular member 37 and through a hole 33a provided in the housing 33. Since the wiring mentioned is subject to rather a high temperature, it is preferably formed of silver, or the like, and is preferably covered with an insulating material capable of withstanding the relatively high temperature mentioned, such for example as polytetrafluoroethylene sold as "Teflon." The sensing resistor RT is formed of material having a high negative temperature coefficient of resistance, such as for example, the ceramic-like material consisting of sintered aluminum oxide, and an oxide of magnesium, manganese, titanium, iron, nickel, cobalt, zinc, etc., and known as "Thermistor" material. For example, the resistor RT may have the exceedingly high negative temperature coefficient of resistance corresponding to a resistance rate change of —0.044 ohm/ohm/° C.

Figures 3, 4:
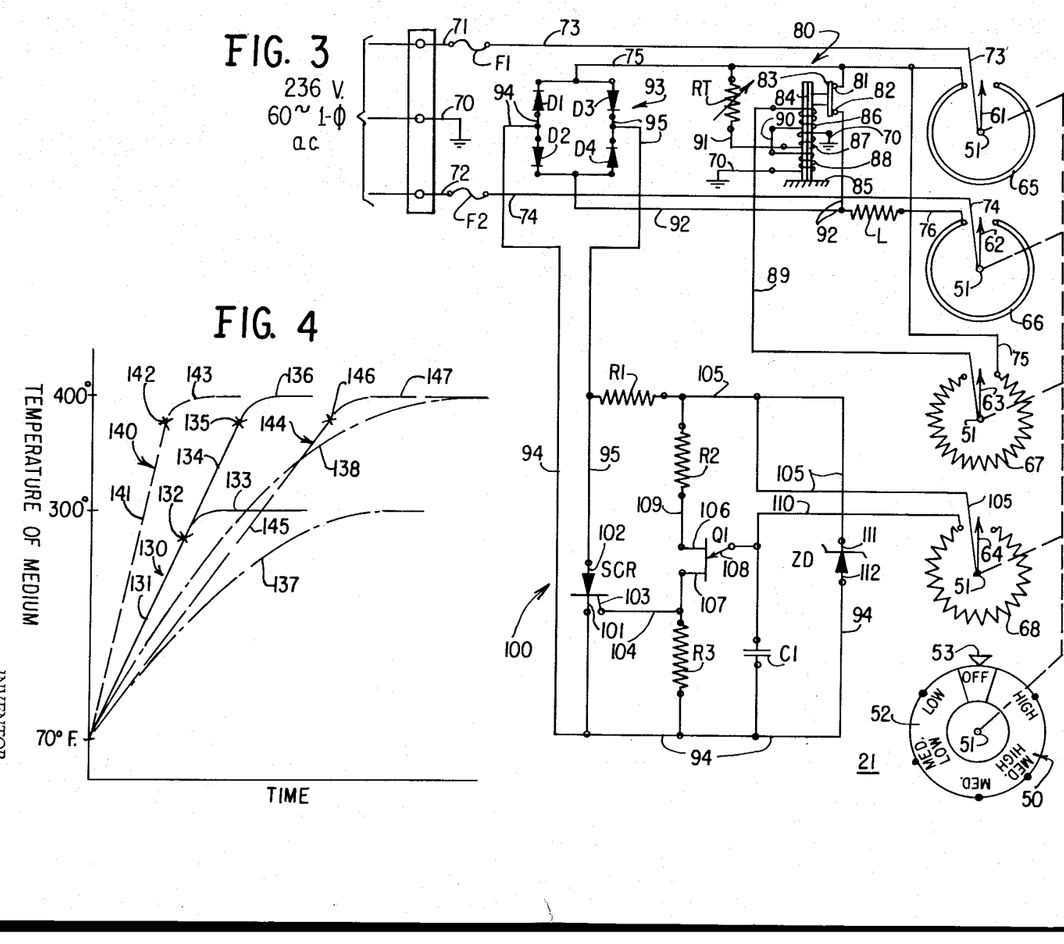
FIG. 3 is a schematic diagram of the electric control circuit for the electric heating unit or hotplate and incorporating the temperature sensing unit shown in FIG. 2 and the improved electric control circuit of the present invention.
FIG. 4 is a graphic illustration of the rate of heating of various loads using the heating system of the present invention and certain typical prior systems.

Referring now to FIG. 3, there is shown a schematic electrical diagram of an electrical heating system incorporating the heating unit 16 and the resistor RT described above, and further including the improved switching arrangement and the improved electronic control arrangement embodying the present invention. The manually operable control switch 21 carried by the backsplash 17 and individually associated with the hotplate 16 comprises a manual dial or knob 50 mounted upon a rotatably mounted operating shaft 51 on the outer end thereof, the knob 50 being provided with indicia 52 cooperating with an index marker 53 carried by the backsplash 17. More particularly, the control switch 21 comprises off, low, medium low, medium, medium high and high positions that correspond to respective portions of the indicia 52 carried by the manual dial 50 and cooperating with the index marker 53. In the arrangement, the indicia 52 carried by the manual dial 50 correspond to the temperature of the cooking vessel, or the like, supported by the hotplate 16; whereby the temperature range between the low position and the high position corresponds to temperatures between about 120° F. and 420° F. of the cooking vessel supported by the hotplate 16. Further, the rotatable shaft 51 of the control switch 21 carries four wipers 61, 62, 63 and 64 that are simultaneously adjusted as the manual knob 50 is rotated. The wipers 61 and 62, respectively, comprise portions of switches, respectively, including cooperating conducting segments 65 and 66; and the wipers 63 and 64, resepectively, comprise movable contacting arms cooperating with resistors 67 and 68 to provide variable resistance elements.

Also the circuit network comprises a three-wire Edison source of power supply of 236 volts, single-phase, A.C. including two outside lines 71 and 72, and a grounded neutral line 70, connected through fuses F1 and F2 to conductors 73 and 74 that are connected to the wipers 61 and 62, respectively. The conducting segments 65 and 66, respectively, terminates two conductors 75 and 76. In the arrangement, when the manual dial 50 occupies its off positions, the wipers 61 and 62 are disengaged from the cooperating conducting segments 65 and 66; respectively; when the manual dial 50 is rotated in the clockwise direction out of its off position about 10°, the wipers 61 and 62, respectively, engage the conducting segments 65 and 66 to connect the conductors 73 and 74 to the conductors 75 and 76, respectively. As the manual dial 50 is rotated further in the clockwise direction, the wipers 61 and 62 remain in contact with the conducting segments 65 and 66 to maintain and apply potential to the conductors 75 and 76.

In accordance with the present invention, the heating unit 16 and specifically the heating element L thereof at the beginning of a heating operation, i.e., when the heating element L is still cool, is connected between the conductors 75 and 76 via a switching mechanism generally designated by the numeral 80 and comprising more specifically a thermostatic switch. The switch 80 includes a pair of contacts 81 and 82, the contact 81 being connected to the conductor 75 and the contact 82 being connected by a conductor 92 to one terminal of the heating element L, the other terminal of the heating element L being connected to the conductor 76, a shorting bar 83 is provided which normally is disposed against and bridges the contacts 81 and 82 whereby to apply the potential appearing between the conductors 75 and 76 and directly to the heating element L. The thermostatic switch 80 further comprises a bi-metallic element 84 connected at one end to the shorting bar 83 and having the other end suitably anchored as at 85 and provided with three heaters in thermal communication therewith and comprising more specifically three coils 86, 87 and 88 disposed thereabout. The coil 86 has one terminal thereof connected by a conductor 89 to the wiper 63 which is adapted to contact the resistor 67 at an adjusted position thereon as determined by the setting of the manual knob 50, one terminal of the resistor 67 being connected to the conductor 75. The other terminal of the heating coil 86 is connected by a conductor 90 to one of the terminals of the heating coil 88, the other terminal of the heating coil 88 being grounded via the conductor 70, whereby upon the operation of the manual knob 50 from its off to an adjusted operative position, a circuit is completed from the conductor 75 through a portion of the resistor 67 to the wiper 83 and along the conductor 89 and through the heating coils 86 and 88 in series to the ground connection 70.

The other heating coil 87 has one terminal thereof connected to the grounded conductor 70 and the other terminal thereof connected by a conductor 91 to one terminal of the resistor RT, the other terminal of the resistor RT being connected to the conductor 75. Accordingly, a heating circuit is established for the heating coil 87 from the conductor 75 through the temperature sensing resistor RT and the conductor 91 and through the coil 88 to the grounded connection 70, this circuit being established as soon as the manual knob 50 is moved from the off to an operating position thereof to cause the wiper 61 to engage the conducting segment 65 thus applying an operating potential of 118 volts between the conductor 75 and the grounded conductor 70.

In the operation of the control circuit for the thermostatic switch 80, the heating coils 86, 87 and 88 when energized serve to heat the bi-metallic element 84 and after a predetermined heating thereof, the bi-metallic element 84 is flexed to the left as viewed in FIG. 3 to remove the shorting bar 83 from engagement with the contacts 81 and 82, thereby to break the connection between the conductor 75 and one terminal of the heating element L via the switch 80 and the conductor 92. The time at which the switch 80 opens after energization of the coils 86, 87 and 88 is determined by the impedance in the associated control circuits therefor, the heating of the coils 86 and 88 being determined by the positioning of the wiper 63 along the resistor 65, and the heating by the coil 87 being dependent upon the temperature sensed by the resistor RT.

Referring first to the heating coils 86 and 88, it will be seen that when the manual knob 50 is positioned to provide a low desired operating temperature for the heating element L, a small portion of the resistor 67 is placed in circuit between the conductor 75 and the wiper 63 so that a large current flows through the coils 86 and 88 and therefore a large amount of heat is provided to heat the bi-metallic element 84, this large amount of heat contributing to an early opening of the thermostatic switching 80. The heating of the coil 87 on the other hand is determined essentially by the heat capacity of the load being heated by the heating element L, in that the temperature sensed by the resistor RT is proportional to the heat capacity of the load, since the amount of energy supplied to the heating element L and therefor the heat therefrom is substantially constant so that the temperature of the load at any time is a function of the heat that has been applied thereto. As has been explained above, the resistor RT has a high negative temperature coefficient of resistance and therefore at the beginning of a cooking operation has a high resistance which severly limits the current applied to the coils 87 and therefore limits to a low value the heat developed thereby. As the temperature of the load in thermal contact with the resistor RT rises, the resistance of the resistor RT rapidly drops so as to apply more heating current to the heating coil 87 and therefore more heat is contributed thereby to the bi-metallic element 84. Accordingly, if the load has a small heat capacity, the heat contribution from coil 87 rises rapidly, whereas on the other hand if the heat capacity of the load is large, the current through the coil 87 rises slowly and the heat contribution therefrom increases slowly. From the above it will be seen that the time in which the thermostatic switch 80 is actuated from its normally closed position to its open position is dependent both upon the setting of the manual control knob 50 and the heat capacity of the load being heated by the heating element L.

Upon the opening of the thermostatic switch 80, the electronic control arrangement of the present invention is placed in circuit with the heating element L between the conductors 75 and 76. To this end a rectifying network 93 has been provided including four diodes D1, D2, D3 and D4 arranged in a fullwave rectifier net between the conductors 75 and 92, the D.C. potential being developed between the conductors 94 and 95. The potential between the conductors 94 and 95 is used as one of the inputs to an electronic control circuit generally designated by the numeral 100, the circuit 100 including a cyclically operable device in the form of a silicon controlled rectifier SCR which is operative in each cycle of operation thereof alternately between conductive and non-conductive conditions. The rectifier SCR includes a pair of power terminals 101 and 102, and a control terminal or gate 103, the rectifier SCR being more particularly a silicon rectifier comprising four rectifying junctions in series, namely p-n-p-n, with the power terminals 101 and 102 connected to the terminal p and n junctions and with the control terminal 103 connected to the intermediate p junction. The rectifier SCR is characterized by having a high impedance to the flow of current between the terminals 101 and 102 thereof in both directions when no control signal is applied to the control terminal 103, and is characterized by having a low impedance to the flow of current between the terminals 101 and 102 thereof in only one direction when a predetermined control signal or pulse is applied to the control terminal 103. It will be noted that the rectifying network 93 and the rectifier SCR are arranged so as to apply a pulsating rectified D.C. potential to the control terminals 101 and 102 at a repetition rate of 120 times per second.

The control circuit 100 further comprises circuit elements for generating and applying the control signal for the control terminal 103 in accordance with the setting of the manual dial 50 of the controller 21. To this end a resistor R1 is provided having one terminal thereof connected to the conductor 95 and having the other terminal thereof connected via a conductor 105 to a series network connecting with the conductor 94 and including in series a resistor R2, an unijunction transistor Q1 and a resistor R3. The transistor Q1 includes a pair of power terminals 106 and 107 and a control terminal 108, the power terminal 106 being connected by a conductor 109 to one terminal of the resistor R2 which has the other terminal thereof connected to the conductor 105, and the other power terminal 107 being connected by a conductor 104 to the control terminal 103 of the rectifier SCR and also to one terminal of the resistor R3 which has the other terminal thereof connected to the main D.C. conductor 94. The unijunction transistor Q1 constitutes a high impedance between the power terminals 106 and 107 thereof until the potential between the control terminal 108 and one of the power terminals 106 or 107 reaches a predetermined critical value at which time the impedance of the transistor Q1 falls to a very low value.

In order to provide the necessary control potential for the transistor Q1 and particularly between control terminal 108 and the power terminal 107 connected to the control terminal 103 of the rectifier SCR, a capacitor charge circuit is provided including a capacitor C1 having one terminal thereof connected to the conductor 94 and the other terminal thereof connected via a conductor 110 to the control terminal 108 of the transistor Q1. Disposed in series with the capacitor C1 is a portion of the resistor 68, one terminal of the resistor 68 being connected to the conductor 110 and the wiper 64 being adapted to engage the resistor 68 and being connected to the conductor 105, whereby that portion of the resistor 68 between the wiper 64 and the conductor 110 is connected in series with the capacitor C1 between the conductors 94 and 105. There further is placed in circuit between the conductors 94 and 105 a Zener diode Zd which is characterized by conduction therethrough when a voltage of the specified magnitude is applied across the terminals 111 and 112 thereof, the terminal 111 being connected to the conductor 105 and the terminal 112 being connected to the conductor 94. The diode Zd therefore applies a substantially constant charging potential across the charging circuit including the capacitor C1 and that portion of the resistor 68 between the wiper 64 and the conductor 110.

It will be seen that if the manual dial 50 is operated to the low position thereof, substantially all of the resistance of the resistor 68 will be disposed in series with the capacitor C1 so that it will require a long time for the capacitor C1 to charge to a potential sufficiently large to fire or render conductive the transistor Q1 which in turn fires or renders conductive the rectifier SCR. Accordingly, the rectifier SCR will fire late in each of the power half cycles from the main conductors 75 and 76 and therefor will be conductive for only a short portion of each power half cycle. If on the other hand the manual dial 50 is set into the high position thereof, the wiper 64 will be moved to a position such that substantially none of the resistor 68 is disposed between the wiper 64 and the conductor 110 so as to place little resistance in the charging circuit of the capacitor C1. As a consequence, the capacitor C1 will rapidly charge to a potential that will fire the resistor Q1 which in turn will fire the rectifier SCR early in or at the beginning of each power half cycle.

The current passing through the heating element L thereof and the heat generated thereby is directly dependent upon the conduction through the rectifier SCR when the thermostatic switch 90 is in the open position thereof, i.e., when the shorting bar 83 is removed from engagement with the contacts 81 and 82. The path for current flow through the heating element L with the parts in this position can be traced during the positive-going half cycles of the power supply from the conductor 75 through the diode D3 and the conductor 95 to one terminal 100 of the rectifier SCR; from the other terminal 101 of the rectifier SCR via the conductor 94 to the diode D2 and via the conductor 92 to one terminal of the heating element L, and from the other terminal of the heating element L to the main line conductor 76. In the negative-going half cycles of the power supply, the current flow is from the conductor 76 through the heating element L and via the conductor 92 to the diode D4 and via the conductor 95 to the terminal 102 of the rectifier SCR; from the terminal 101 of the rectifier SCR via the conductor 94 to the diode D1 which is connected to the conductor 95. It will be seen therefore that during both the positive-going half cycles and the negative-going half cycles of the power supply, the conduction of current through the heating element L is dependent upon the state of conduction of the rectifier SCR, and more specifically upon the ratio between the length of the conductive and non-conductive cycles thereof. The ratio between the conductive and non-conductive cycles of the rectifier SCR in turn is directly controlled by the position of the control knob 50 which in turn controls the position of the wiper 64 along the resistor 68.

Referring to FIG. 4 of the drawings, there are shown therein heating curves diagrammatically illustrated the relationship between the temperature of the medium being heated by the heating element L and the time required to reach the operating temperatures corresponding to the various settings of the controller 50 for various heat capacities of the medium heated by the heating element L, these heating curves for the electric heating system of the present invention being compared to typical heating curves for prior electric heating systems. Assuming that all of the heating cycles begin at an ambient temperature of 70° F., the solid line curve designated by the numeral 130 represents the heating rate for a medium load, i.e., a load having a medium heat capacity. It will be noted that the lower portion 131 of the curve 130 is essentially a straight line and remains so until a control point 132 is reached, the control point 132 corresponding to a setting of the manual dial 50 for a medium heating operation or a desired operating temperature on the order of about 300° F. During the heating operation represented by the straight line 131 between 70° F. and control point 132, the thermostatic switch 80 is in the normal closed position thereof so as to apply the full operating potential between the conductors 75 and 76 across the heating element L. The applied potential is substantially constant and therefore the heat generated by the heating element L is essentially constant and produces a substantially constant rate of rise of the temperature of the medium being heated. At the control point 132, the combined heating effects of the heating coils 86 and 88 as determined by the setting of the manual knob 50 and of the coil 87 as determined by the value of the resistor RT in contact with the medium being heated is such as to actuate the thermostatic switch 80 from its normally closed position to its open operable position which places the heating element L in series with the rectifier SCR through the rectifying bridge 93. The energization of the heating element L will now be under the control of the circuit 100 which in turn is controlled by the setting of the manually operable knob 50 and more specifically, the setting of the wiper 64 along the resistor 68. This operation of the heating element L will provide a typical control of the temperature as indicated by the curve 133, the current supplied to the heating element L being substantially constant and producing a substantially constant heating at the predetermined and preset temperature of 300° F.

If the manual knob 50 has been set to the high position thereof so as to select an operating temperature on the order of 400° F., then the straight portion of the curve does not end at the control point 132 but extends upwardly along the line 134 to a control point 135, the thermostatic switch 80 remaining in the normal closed position thereof until the temeprature reaches the control point 135 at which time the combined heating effects of the coils 86, 87 and 88 will open the thermostatic switch 80 to place the operation of the heating element L under the control of the circuit 100 and the rectifier SCR. The operation of the control circuit 100 will produce a heating curve as indicated at 136 which will serve to hold the temperature at the desired value of about 400° F.

The advantages of the electric heating system of the present system over the prior systems is more fully realized by comparing the heating curves of typical prior systems with the curves 130–133 and 130–136 in FIG. 4. More specifically, the curve 137 in washed-dot lines illustrates a typical heating curve for a prior heating system adjusted to produce a final operating temperature of about 300° F., it being noted that the curve 137 reaches the operative temperatures 300° F. at a time substantially later than the curve 133 illustrating the operation of the electric heating system of the present invention. Likewise, the heating curve 138 also in dashed-dot lines and representing a typical prior heating system adjusted to operate at a final temperature of 400° F. demonstrates that the desired final heating temperature using a prior heating system is achieved substantially later than is the case of the improved electric heating system of the present invention.

It is to be understood that the choice between the heating operations represented by the curves 133 and 136, i.e., the final operating temperature of the system, is determined by the setting of the manual control knob 50 and particularly the position of the wiper 63 along the resistor 67, whereas the position in time of the control points 132 and 135 is a joint function of the setting of the control knob 50 and the operation of the resistor RT, all of the data being taken with the same fixed heating load, i.e., the loads having the same heat capacity. The effect of varying the heat capacity of the load while retaining the control knob 50 in the same position such as the high position thereof, is illustrated by the curves 140 and 144 shown in dashed lines in FIG. 4. Referring first to the curve 140, this represents a typical heating operation wherein the heat capacity of the load in contact with the heating element L is substantially less than the heat capacity of the load utilized in determining the curve 130–136. It will be noted that the curve 140 includes a typical straight line section 141 corresponding to the operation of the heating system wherein the thermostatic switch 80 is in the normal closed position thereof so that the full operating potential between the conductor 75 and 76 is applied to the heating element L. The point 142 represents a control point at which the thermostatic switch 80 opens to place the heating element L under the control of the circuit 100 and more specifically in series with the rectifier SCR. That portion of the curve designated 143 represents the action of the system when it arrives at the desired operating temperature of 400° as set by the manual controller 50. It is pointed out that the slope of the straight curved portion 141 is fundamentally determined by the heat capacity of the load being heated inasmuch as the heat input to the load from the heating element L is substantially constant, the slope of the curved portion 141 being greater for smaller loads and vice versa. More specifically, the curve 144 represents a typical curve obtained when heating a substantially larger load, the curve 144 including a straight portion 145 corresponding to the operation of the system with the thermostatic switch 80 closed to apply the full operative potential between the conductor 75 and 76 across the heating element L. The point 146 indicates the control point at which the thermostatic switch 80 opens to place the operation of the heating element L under the control of the circuit 100, and more specifically, in series with the rectifier SCR, the curve portion 148 representing the latter operation of the system.

Recapitulating, the slope of the straight portions 131, 141 and 145 of the various curves is fundamentally a function of the heat capacity of the load or the medium being heated by the heating element L. The temperature at which the control points 135, 142 and 146 occur are determined fundamentally by the setting of the manual control knob 50 which in turn sets the desired final operating temperature. Consequently, the times at which the control points 135, 142 and 146 occur are functions both of the temperature setting as selected and by the manual knob 50 and the heat capacity of the object or medium being heated as sensed by the resistor RT.

Now assuming that the cook wishes to carry out a medium temperature cooking operation upon the hotplate 16 and that the heating element L thereof is cool and that the bi-metallic element 84 is cool, the cook places the cooking vessel and its contents in a supported position on the top of the heating element L, whereby the bottom wall of the cooking vessel engages the sensing button 45 and moves the sensing unit 27 into its depressed position so that the sensing button 45 is in good thermal contact with the bottom of the cooking vessel. At this time, the thermostatic switch 80 is closed, and the resistor RT is cool so that it has the exceedingly high resistance previously noted. Finally, the cook rotates the manual dial 50 in the clockwise direction from its off position to its medium position whereby the wipers 61 and 62 engage the conducting segments 65 and 66, respectively, so as to apply the high operating potential to the conductors 75 and 76.

The thermostatic switch 80 being closed, a connection is made from the conductor 75 via the switch 80 and the conductor 92 to one terminal of the heating element L, the other terminal of the heating element L being connected to the conductor 76, whereby to apply the full operating potential to the heating element L to provide a maximum heat output therefrom and therefore to obtain the maximum heating of the cooking vessel in contact therewith. A control circuit is also created for controlling the subsequent actuation of the thermostatic switch 80, the control circuit being from the conductor 75 through that portion of the resistor 67 between the conductor 75 and the wiper 63, the conductor 89, and the heating coils 86 and 88 in series to the ground connection 70; a further control circuit is provided from the conductor 75 through the resistor RT via the conductor 91 to the heating coil 87 and then to the ground conductor 70. The rate of heating in the coils 86 and 88 is determined by the position of the wiper 63 along the resistor 67 which is in turn set by the manual dial 50. Initially, the heating of the coil 87 is low and substantially zero since the resistor RT is cold and has a high resistance. As the cooking vessel is heated at a maximum heating rate by the operation of the heating element L, the resistance of the resistor RT progressively decreases and therefore the heating by the coil 87 progressively increases, the rate of increase being a function of the heat capacity of the load being heated by the heating element L. Eventually, the constant heating rate of the coils 86 and 88 and the progressively increasing heating rate of the coil 87 will cooperate to provide sufficient heat in the bi-metallic element 84 to cause opening thereof and consequently actuation of the switch 80 from the normal closed position thereof to the operative open position thereof.

The opening of the thermostatic switch 80 places the heating element L in series with the rectifier SCR via the rectifying network 93 so that the power supplied thereto and consequently the heat generated thereby and applied to the cooking vessel resting thereon is a function of the ratio between the conductive and non-conductive portions of the operating cycle of the rectifier SCR. The operation of the rectifier SCR is controlled by the setting of the manual dial 50 and in the medium position thereof approximately one-half of the resistance of the resistor 68 is disposed between the wiper arm 64 and the conductor 110 and therefor in series with the charging capacitor C1. With the parts so adjusted, the rectifier SCR will be fired or rendered conductive at about the midpoint of each of the power half cycles appearing between the conductors 75 and 76 and therefore about one-half of the current and consequently one-quarter of the maximum power is supplied to the heating element L. The parts are so adjusted and calibrated that this power will maintain the load at the desired operating temperature. It will be noted that the control circuits for the thermostatic switch 80 remain energized even after thermostatic switch 80 has been actuated to its open position so that the switch 80 remains open until the end of the cooking operation, i.e., until the manual dial 50 has been moved to its off position so as to remove the potential from the conductors 75 and 76. Removal of the potential from the conductors 75 and 76 will de-energize the circuits for the heating coils 86, 87 and 88 and consequently the bi-metallic element 84 will quickly cool to ambient temperature and will be ready to control a subsequent cooking operation.

It will be understood that the cooking operations will be carried out in a like manner for other adjustments of the manual dial 50 and the desired operation of the heating system is obtained even with widely varying loads, i.e., loads having substantially different heat capacities. More specifically, the system quickly heats the load with maximum applied power to a point just below the desired operating temperature as set by the manual dial 50, and thereafter the heating of the load is controlled by the circuit 100 and the rectifier SCR to maintain the temperature of the load at the desired operating temperature, the operating temperature also being selected by the manual dial 50.

Figure 5:
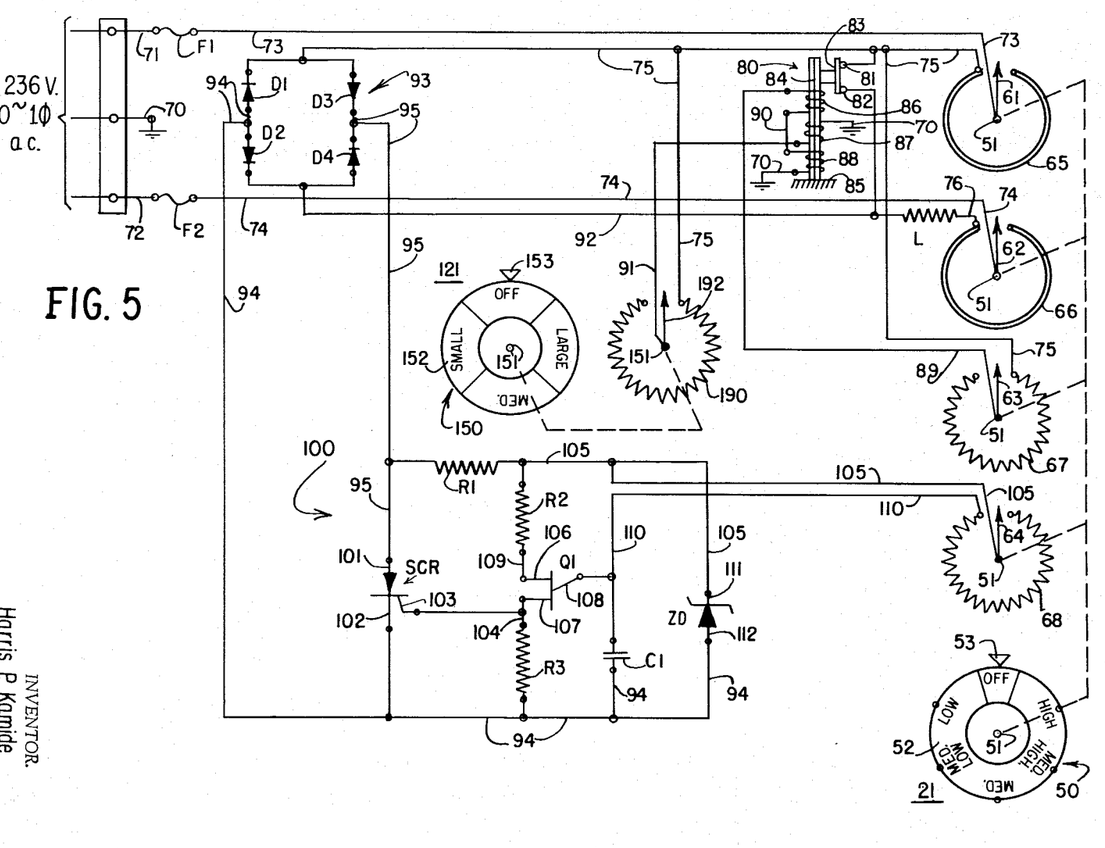
FIG. 5 is a schematic diagram, similar to FIG. 3, and illustrating a second embodiment of the control circuit of the present invention.

There is shown in FIG. 5 of the drawings a second preferred embodiment of the control system illustrated in FIG. 3, like designations and like numerals having been given to like circuit elements. The system of FIG. 5 differs from the system of FIG. 3 fundamentally in substituting a manually operable controller 121 mounted upon the backsplash 17 for the thermistor RT in the control circuit for the thermostatic switch 80. More specifically, all of the elements in the circuit of FIG. 5 function in the same manner as the corresponding elements in the circuit of FIG. 3 with the exception of the control circuit for the heating coil 87 of the thermostatic switch 80.

In the electric heating system illustrated in FIG. 5, the manually operable control switch 121 comprises a manual dial or knob 150 mounted on the outer end of a rotatably mounted operating shaft 151, the knob 150 being provided with indicia 152 cooperating with an index marker 153 carried by the backsplash 17. More particularly, the controller 121 comprises off, small, medium and large positions that correspond to respective portions of the indicia 152 carried by the manual dial 150 and cooperating with the index marker 153. In the arrangement, the indicia 152 carried by the manual dial 150 corresponds to the sizes or heat capacities of the loads to be heated by the hotplate 16, the size and capacity of the load being visually estimated by the cook and the manual knob 150 adjusted accordingly. Further, the rotatable shaft 151 of the controller 121 carries a wiper 192 comprising a portion of a rheostat including a resistor 190, one end of the resistor 190 being connected to the conductor 75 and the wiper 192 being connected by the conductor 91 to one terminal of the heating coil 87 which has the other terminal thereof connected to the grounded conductor 70. Accordingly, the current through the heating coil 87 of the thermostatic switch 80 and the subsequent heat generated thereby is dependent upon the position of the wiper 192 along the resistor 190, the smaller the portion of the resistor 190 in circuit with the coil 87 the greater the heating thereby and the more quickly the thermostatic switch is actuated from its normally closed to its normally open position, and conversely, the larger the portion of the resistor 190 in circuit with the heating coil 87 the smaller will be the heat output therefrom and consequently the thermostatic switch 80 will open later. It will be noted that the manual knob 150 is so related to the wiper 192 that when the knob 150 is in the "small" position thereof, a very small portion of the resistor 190 is in series with the heating coil 87; when the manual knob 150 is in the "medium" position thereof, about half of the resistance of the resistor 190 is in series with the heating coil 87; and when the manual knob 150 is in the "large" position thereof, substantially all of the resistance of the resistor 190 is in series with the heating coil 87.

Now assuming that the cook wishes to carry out a medium temperature cooking operation upon the hotplate 16 to heat a medium sized load, and further assuming that the heating element L is cool and that the thermostatic switch 80 is closed and the bi-metallic element thereof is cool, the cook places the cooking vessel and its contents representing the medium size load in a supporting position on the top surface of the heating element L, whereby the bottom wall of the cooking vessel is in the good thermal contact therewith. The cook then rotates the normal knob 150 in the clockwise direction from its off position to its medium position whereby the wiper 192 engages the resistor 190 substantially at the midpoint thereof and thus to place substantially half of the resistance of the resistor 190 in series with the heating coil 87 of the thermostatic switch 80. Finally, the cook rotates the manual knob 50 in the clockwise direction from its off position to its medium position whereby the wipers 61 and 62 engage the conducting segments 65 and 66, respectively, so as to complete a circuit to the conductors 75 and 76. Since the thermostatic switch 80 is closed, the full line potential between the conductors 75 and 76 will be applied to the heating element L via the thermostatic switch 80 and the conductor 92. The heating element L therefore operates at maximum power to head the load disposed thereupon.

At the same time that the heating element L is energized, the control circuits for the thermostatic switch 80 are also energized. A first control circuit is established from the conductor 75 through approximately one-half of the resistor 67, the wiper 63 and the conductor 89 to one terminal of the heating coil 86; then through the heating coils 86 and 88 in series to the grounded conductor 70. The second control circuit is also established from the conductor 75 through that portion of the resistor 190 between the conductor 75 and the wiper 192, and through the wiper 192 and the conductor 91 to the one terminal of the heating coil 87, the other terminal of the heating coil being grounded via the conductor 70. It will be seen therefore that the heating of the bi-metallic element 84 will be carried forward by all three of the heating coils 86, 87 and 88, the heat contribution from the coils 86 and 88 being determined by the setting of the manual knob 50 in accordance with the desired final operating temperature and the heat contribution from the heating coil 87 being determined by the setting of the manual knob 150 in accordance with the size of the load to be heated. Eventually the combined contributions of heating from the coils 86, 87 and 88 will actuate the thermostatic switch 80 from its normally closed position to its operative open position whereby to place the heating element L in series with the control circuit 100 and particularly the rectifier SCR via the rectifying network 93. The heating of the load will now be controlled in accordance with the position of the wiper 64 along the resistor 68 which is set by the manual knob 50 as has been explained above with respect to the system of FIG. 3. The thermostatic switch 80 will be held in its open position until the manual knob 50 is turned to its off position and the bi-metallic element 84 has cooled, the heaters 86, 87 and 88 being fully energized even after the thermostatic switch 80 has been actuated to its open position so long as the manual knob 50 is in one of its heating positions.

It is to be understood that the heating operations can be carried in a like manner at any of the other heating positions of the manual knob 50. Likewise, the system of FIG. 5 can be adjusted to accommodate small heating loads or large heating loads upon the heating element L by adjusting the manual knob 150 in accordance with the size of the load. Accordingly, the load will be rapidly heated from ambient temperature to a point just below the desired operating temperature thereof as determined by the setting of the manual knob 50, the proper time for switching from full power operation of the heating element L to controlled rectifier operation via the rectifier SCR being governed both by the final desired operating temperature as set by the manual knob 50 and the size or the heat capacity of the heating load as determined by the setting of the manual dial 150.

In view of the foregoing, it is apparent that there has been provided in an electric heating system an improved combination switching arrangement and electronic control arrangement wherein full power is supplied to the heating element in heating the load from ambient temperature to a temperature just below the desired operating temperature, after which the operation of the heating element is placed under the control of a circuit including a silicon controlled rectifier which is operative to supply power to the heating element at a low rate to maintain the load at the desired operating temperature. The change in the connection of the heating element from full line power to silicon controlled rectifier control is accomplished by an improved switching mechanism including a thermostatic switch controlled both by the desired operating temperature as set by a manually operable controller and the heat capacity or size of the load to be heated. In one preferred form of the invention, the size of the load or heat capacity thereof is automatically sensed by the thermistor RT so that the point of switching from full line power to control power for the heating unit is automatically and accurately controlled and in fact is continuously adjusted while the heating operation proceeds. In the second preferred embodiment of the invention, the cook estimates the size of the load or the heat capacity thereof and adjusts a second manually operable controller in accordance with the estimate of the size of the load.

In both of the systems illustrated, the load is quickly heated by the heating unit with full line power applied thereto with the temperature just below the final selected operative temperature after which the heating unit is operated by means of an electronic control circuit so as to supply a selected variable amount of power to the heating unit for heating the load and maintaining its temperature at the manually selected operating temperature.

While there has been described what is at present considered to be preferred embodiments of the invention, it will be understood that various modifications may be made therein, and it is intended to cover in the appended claims all such modifications that fall within the true spirit and scope of the invention.

What is claimed is:

1. In an electric heating system including a heating unit and a source of electric power; a cyclically operable device operative in each cycle thereof alternately between conductive and non-conductive conditions, switching mechanism having a normal position connecting said heating unit independent of said device to said power source so as to supply high power to said heating unit and having an operated position connecting said heating unit and said device in series relation to said power source so as to supply controlled low power to said heating unit, a first controller selectively operable in accordance with different desired temperatures of the medium heated by said heating unit, a second controller selectively operable in accordance with the heat capacity of the medium heated by said heating unit, a first control circuit operatively connected to said switching mechanism and jointly governed by said first controller and by said second controller for actuating said switching mechanism from its normal position into its operated position, and a second control circuit operatively connected to said device and governed by said first controller for varying the ratio between the conductive condition and the non-conductive condition of said device in each cycle of operation thereof so that the power thus supplied to said heating unit in said series connection is selectively varied in accordance with the setting of said first controller.

2. The electric heating system combination set forth in claim 1, wherein said first controller is a manually operable controller, and said second controller is a temperature sensing unit operable to sense the temperature of the medium heated by said heating unit.

3. The electric heating system combination set forth in claim 1, wherein said first controller is a first manually operable controller, and said second controller is a second manually operable controller.

4. In an electric heating system including a heating unit and a source of electric power; a cyclically operable device operative in each cycle thereof alternately between conductive and non-conductive conditions, switching mechanism having a normal position connecting said heating unit independent of said device to said power source so as to supply high power to said heating unit and having an operated position connecting said heating unit and said device in series relation to said power source so as to supply controlled low power to said heating unit, a first controller selectively operable in accordance with different desired temperatures of the medium heated by said heating unit, a second controller selectively operable in accordance with the heat capacity of the medium heated by said heating unit, a first control apparatus operatively connected to said first controller and being variably positioned by variable operation of said first controller, a first control circuit operatively connected both to said switching mechanism and said first control apparatus and jointly governed by the variable position of said control apparatus and by said second controller for actuating said switching mechanism from its normal position into its operated position, second control apparatus operatively connected to said first controller and being variably positioned by variable operation of said first controller, and a second control circuit operatively connected both to said device and said second control apparatus and governed by the variable position of said control apparatus to vary the ratio between the conductive condition and the non-conductive condition of said device in each cycle of operation thereof so that the power thus supplied to said heating unit in said series connection is selectively varied in accordance with the setting of said first controller.

5. In an electric heating system including a heating unit and a source of electric power; a solid state controlled rectifier having a pair of power terminals and a control terminal and characterized by conduction between the power terminals thereof in response to the application of a control signal to the control terminal thereof, switching mechanism having a normal position connecting said heating unit independent of said rectifier to said power source so as to supply high power to said heating unit and having an operated position connecting said heating unit and the power terminals of said rectifier in series relation to said power source so as to supply controlled low power to said heating unit, a manually operable controller for selectively setting different desired temperatures of the medium heated by said heating unit, a temperature sensing unit operable to sense the temperature of the medium heated by said heating unit, a first control circuit operatively connected to said switching mechanism and jointly governed by said manually operable controller and by said temperature sensing unit for actuating said switching mechanism from its normal position into its operative position, a second control circuit operatively connected to said rectifier and governed by said manually operable controller and operative to produce control signals in accordance with the setting thereof, and means for impressing said control signals upon the control terminal of said rectifier so as to govern the conduction between the power terminals thereof so that the power thus supplied to said heating unit in said series connection is selectively varied in accordance with the setting of said manually operable controller.

6. In an electric heating system including a heating unit and a source of A.C. electric power; a solid state controlled rectifier having a pair of power terminals and a control terminal and characterized by conduction between the power terminals thereof in response to the application of a control signal to the control terminal thereof, switching mechanism having a normal position connecting said heating unit independent of said rectifier to said power source so as to supply high power to said heating unit and having an operated position connecting said heating unit and the power terminals of said rectifier in series relation to said power source so as to supply controlled low power to said heating unit, a manually operable controller for selectively setting different desired temperatures of the medium heated by said heating unit, a temperature sensing unit operable to sense the temperature of the medium heated by said heating unit, a first control circuit operatively connected to said switching mechanism and jointly governed by said manually operable controller and by said temperature sensing unit for actuating said switching mechanism from its normal position into its operated position, a second control circuit operatively connected to said rectifier and governed by said manually operable controller and operative only during predetermined half cycles of said power source to produce control signals having a predetermined time phase relationship to the corresponding predetermined half cycles of said power source, and means for impressing the control signals upon the control terminal of said rectifier so as to govern the conduction between the power terminals thereof for the corresponding time intervals during the corresponding predetermined half cycles of said power source, said second control circuit being selectively governed by the variable operation of said controller selectively to vary the predetermined time phase relationship of said control signals to the corresponding predetermined half cycles of said power source, whereby the corresponding time intervals of conduction between the power terminals of said rectifier during the corresponding predetermined half cycles of said power source are selectively varied in accordance with the variable operation of said manually operable controller.

7. The electric heating system combination set forth in claim 6, wherein the range of variation of said second control circuit is matched to the range of variation of said manually operable controller, whereby the corresponding time intervals of conduction between the power terminals of said rectifier during the corresponding predetermined half cycles of said power source may be selectively varied substantially from 100% to 0% of the time intervals of the corresponding predetermined half cycles of said power source.

8. In an electric system including a heating unit and a source of A.C. electric power; a solid state controlled rectifier having a pair of power terminals and a control terminal and characterized by conduction between the power terminals thereof in response to the application of a control signal to the control terminal thereof, a power rectifier having a pair of A.C. input terminals and a pair of D.C. output terminals, switching mechanism having a normal position connecting said heating unit independent of said rectifiers to said power source so as to supply high power to said heating unit and having an operated position connecting said heating unit and the power terminals of said solid state controlled rectifier and the D.C. output terminals of said power rectifier in series relation to said power source so as to supply controlled low power to said heating unit, a first controller selectively settable in accordance with different desired temperatures of the medium heated by said heating unit, a second controller selectively settable in accordance with the heat capacity of the medium heated by said heating unit, a first control circuit operatively connected to said switching mechanism and jointly governed by said first controller and by said second controller for actuating said switching mechanism from its normal position into its operated position, a second control circuit operatively connected to said power rectifier and said solid state controlled rectifier and governed by said first controller and operative only during the predetermined half cycles of said power source producing an output at the D.C. output terminals of said power rectifier to produce control signals having a predetermined time phase relationship to the corresponding predetermined half cycles of said power source, and means for impressing the control signals upon the control terminal of said solid state controlled rectifier so as to govern the conduction between the power terminals thereof for the corresponding time intervals during the corresponding predetermined half cycles of said power source, whereby the corresponding time intervals of conduction between the power terminals of said solid state controlled rectifier during the corresponding predetermined half cycles of said power sources are selectively varied in accordance with the operation of said first controller.

9. In an electric heating system including a heating unit and a source of electric power; a solid state controlled rectifier having a pair of power terminals and a control terminal and characterized by conduction between the power terminals thereof in response to the application of a control signal to the control terminal thereof, switching mechanism having a normal position connecting said heating unit independent of said rectifier to said power source so as to supply high power to said heating unit and having an operated position connecting said heating unit and the power terminals of said rectifier in series relation to said power source so as to supply controlled low power to said heating unit, a first manually operable controller selectively settable in accordance with different desired temperatures of the medium heated by said heating unit, a second manually operable controller selectively settable in accordance with the heat capacity of the medium heated by said heating unit, a first control circuit operatively connected to said switching mechanism and jointly governed by said first manually operable controller and by said second manually operable controller for actuating said switch mechanism from its normal position into its operable position, a second control circuit operatively connected to said rectifier and governed by said first manually operable controller and operative to produce control signals in accordance with the setting thereof, and means for impressing said control signals upon the control terminal of said rectifier so as to govern the conduction between the power terminals thereof so that the power thus supplied to said heating unit in said series connection is selectively varied in accordance with the setting of said first manually operable controller.

10. In an electric heating system including a heating unit and a source of electric power; a cyclically operable device operative in each cycle thereof alternately between conductive and non-conductive conditions, a thermostatic switch having a normal position connecting said heating unit independent of said device to said power source so as to supply high power to said heating unit and having an operated position connecting said heating unit and said device in series relation to said power source so as to supply controlled low power to said heating unit, a first control heater and a second control heater operatively associated with said thermostatic switch and effective after a predetermined heating thereby to actuate said thermostatic switch from its normal position to its operated position, a first controller for selectively setting different desired temperatures of the medium heated by said heating unit and for selectively setting the rate of heating of said first control heater, a second controller for selectively setting the rate of heating of said second control heater in accordance with the heat capacity of the medium heated by said heating unit, a first control circuit operatively connected to said thermostatic switch and said first control heater and said second control heater and jointly governed by said first controller and by said second controller for actuating said thermostatic switch from its normal position into its operative position, and a second control circuit operatively connected to said device and governed by said first controller for varying the ratio between the conductive condition and the non-conductive condition of said device in each cycle of operation thereof so that the power thus supplied to said heating unit in said series connection is selectively varied in accordance with the setting of said first controller.

11. The electric heating system combination set forth in claim 10, wherein said second controller comprises a temperature sensing unit arranged to sense the temperature of the medium heated by said heating unit and connected to control the operation of said second control heater in accordance with the temperature sensed.

12. The electric heating system combination set forth in claim 10, wherein said second controller comprises a manually adjustable variable impedance and said power source for controlling the operation of said second control heater.

References Cited by the Examiner
UNITED STATES PATENTS

| | | | |
|---|---|---|---|
| 3,050,611 | 8/1962 | Kamide | 219—501 |
| 3,051,813 | 8/1962 | Busch et al. | 219—489 |
| 3,097,314 | 7/1963 | Harriman | 219—501 |
| 3,109,910 | 11/1963 | Fogleman | 219—501 |

RICHARD M. WOOD, *Primary Examiner.*